(12) United States Patent
Nakajima et al.

(10) Patent No.: US 11,054,236 B2
(45) Date of Patent: Jul. 6, 2021

(54) TAPE WINDING DEVICE

(71) Applicant: Yazaki Corporation, Tokyo (JP)

(72) Inventors: Hiromasa Nakajima, Makinohara (JP); Ryo Inoue, Makinohara (JP); Morihiro Fujimatsu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 91 days.

(21) Appl. No.: 16/712,173

(22) Filed: Dec. 12, 2019

(65) Prior Publication Data

US 2020/0116467 A1    Apr. 16, 2020

Related U.S. Application Data

(63) Continuation of application No. PCT/JP2018/028707, filed on Jul. 31, 2018.

(30) Foreign Application Priority Data

Jul. 31, 2017  (JP) .............................. JP2017-148247

(51) Int. Cl.
*G01B 3/1007* (2020.01)

(52) U.S. Cl.
CPC .... *G01B 3/1007* (2020.01); *G01B 2003/1015* (2013.01)

(58) Field of Classification Search
CPC .......... G01B 3/1007; G01B 2003/1015; H01B 13/01281

(Continued)

(56) References Cited

U.S. PATENT DOCUMENTS 5,016,345 A * 5/1991 Aligue ................... H01R 43/28
                                                           211/60.1
5,271,791 A * 12/1993 Tanaka .................. B65B 27/105
                                                           156/468

(Continued)

FOREIGN PATENT DOCUMENTS

JP        7-101641 A      4/1995
JP     2005-189475 A      7/2005

(Continued)

OTHER PUBLICATIONS

International Search Report (PCT/ISA/210), issued by International Searching Authority in corresponding International Application No. PCT/JP2018/028707, dated Oct. 30, 2018.

(Continued)

*Primary Examiner* — Yaritza Guadalupe-McCall
(74) *Attorney, Agent, or Firm* — Sughrue Mion, PLLC

(57) ABSTRACT

A tape winding device includes a fixed plate having a fixed plate side notch, a rotation plate having a rotation plate side notch which the linear member to be inserted into or removed from when a position of the rotation plate side notch is aligned with a position of the fixed plate side notch, a tape support unit and a position regulating member configured to regulate a position of the linear member in the fixed plate side notch and the rotation plate side notch such that the linear member is located at the bottom region of the fixed plate side notch and the rotation plate side notch, the position regulating member having a distal end arm portion, the distal end arm portion running across an opening of the fixed plate side notch and extending over two opposing inner edges of the fixed plate side notch at a regulation position.

3 Claims, 12 Drawing Sheets

(58) Field of Classification Search
USPC .......................................................... 33/767
See application file for complete search history.

(56) References Cited

U.S. PATENT DOCUMENTS

| | | | | |
|---|---|---|---|---|
| 5,606,909 | A * | 3/1997 | Ohta | H01R 43/28 |
| | | | | 100/1 |
| 5,614,042 | A * | 3/1997 | Nishide | B65B 27/105 |
| | | | | 100/10 |
| 6,328,243 | B1 * | 12/2001 | Yamamoto | B65H 75/4449 |
| | | | | 191/12.2 R |
| 10,755,853 | B2 * | 8/2020 | Yamaguchi | B65H 54/2896 |
| 2005/0141080 | A1 | 6/2005 | Kohno | |
| 2019/0214165 | A1 * | 7/2019 | Mabuchi | H01B 13/02 |
| 2020/0116467 | A1 * | 4/2020 | Nakajima | G01B 3/1007 |
| 2021/0012931 | A1 * | 1/2021 | Enomoto | H01B 13/012 |

FOREIGN PATENT DOCUMENTS

| | | | |
|---|---|---|---|
| JP | 2015-189475 A | 11/2015 | |
| JP | 2015-224123 A | 12/2015 | |
| WO | WO-2017191763 A1 * | 11/2017 | ............. B65B 27/00 |
| WO | WO-2018074266 A1 * | 4/2018 | ............. H01B 13/26 |

OTHER PUBLICATIONS

Written Opinion (PCT/ISA/237) issued by the International Searching Authority in corresponding International Application No. PCT/JP2018/028707, dated Oct. 30, 2018.

* cited by examiner

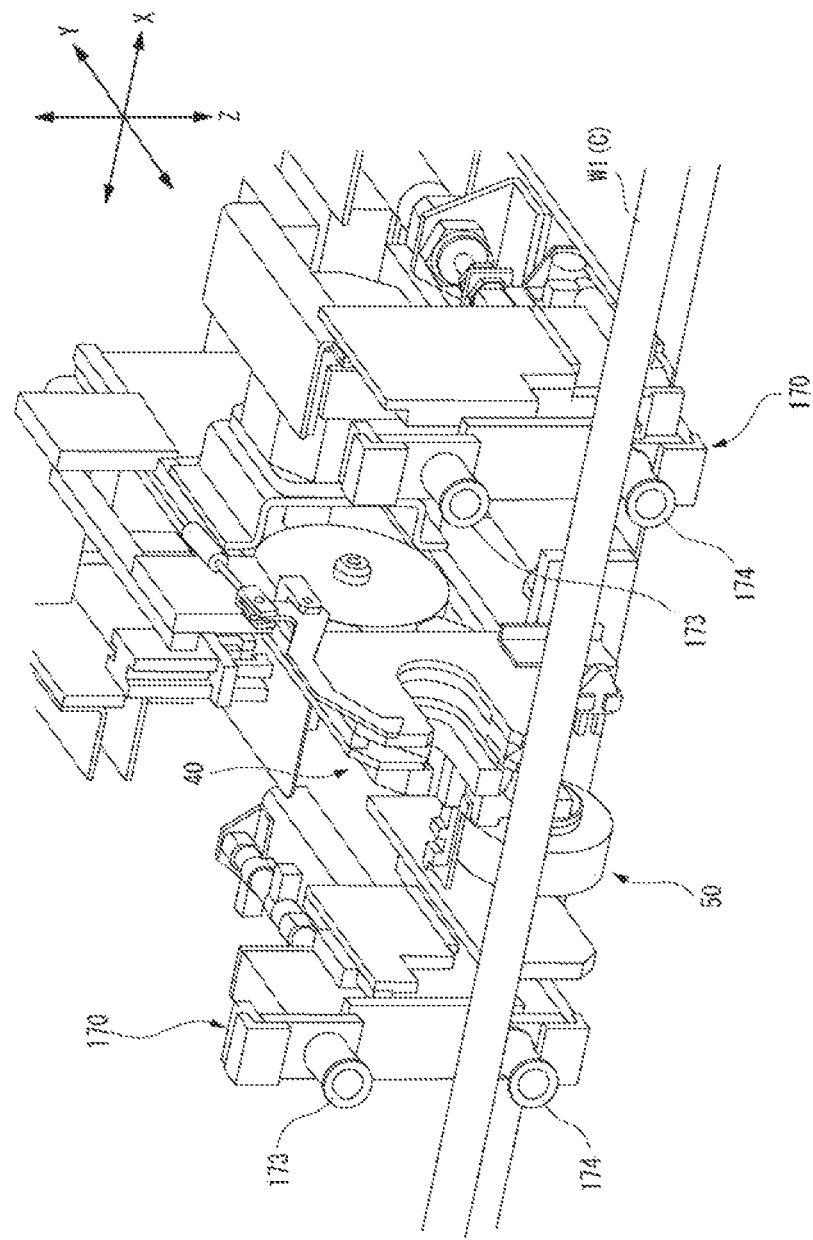

TAPE WINDING DEVICE

CROSS-REFERENCE TO RELATED APPLICATIONS

The present application is a continuation application of PCT/JP2018028707 that claims priority to Japanese Patent Application No. 2017-148247 filed on Jul. 31, 2017, the entire content of which is incorporated herein by reference.

TECHNICAL FIELD

The present invention relates to a tape winding device that winds a tape around a linear member such as an electric wire or an exterior member covering an outer part of the electric wire.

BACKGROUND

A tape winding device is used in a part of a manufacturing step of a wire harness. The tape winding device winds a tape around an outer periphery of a linear member (hereinafter, may be simply referred to as "harness") such as an electric wire or an exterior member covering an outer part of the electric wire. As an example of this type of tape winding device, a tape winding device disclosed in Patent Literature 1 (JP2015-224123A) is known. The tape winding device winds a tape in a spiral shape around an outer periphery of a harness by holding the harness in an unfolded state on a wiring board and moving a head unit, which holds the tape, along a longitudinal direction of the harness.

The tape winding device rotates a tape around the harness as a center, and includes a turning unit which rotates the tape in the head unit. The turning unit includes a fixed plate (a support plate and an opposing plate) disposed in a plane orthogonal to the harness, and a rotation plate (a driven gear and a rotation panel) disposed adjacent to the fixed plate. The rotation plate is driven to rotate within a plane orthogonal to the harness.

U shaped notches running from the outer peripheral edge toward the central region including the rotation axis of the rotation plate are provided respectively in the fixed plate and the rotation plate. The harness is inserted into/removed from the notches in a state where the notch of the fixed plate is aligned with the notch of the rotation plate. The tape to be wound around the harness is supported by a tape support unit which rotates together with the rotation plate.

During winding, the rotation plate is rotated in a state where the harness is inserted into a bottom region of the notches of the fixed plate and the rotation plate. As a result, the tape supported by the tape support unit rotating together with the rotation plate is rotated and wound around the harness. Therefore, when the harness and the head unit are moved relative to each other along the longitudinal direction of the harness, the tape can be wound spirally around the outer periphery of the harness.

In the tape winding device described above, the rotation plate having the U-shaped notch is rotated relative to the fixed plate having the U-shaped notch at a position adjacent to the fixed plate. While the rotation plate is being rotated, one edge of the U-shaped notch of the fixed plate and one edge of the U-shaped notch of the rotation plate, the edges facing each other along the rotation direction, intersect with each other at some point of time.

Meanwhile, when the rotation plate is being rotated, the harness is located at a bottom region in the notch and the harness is always subjected to the unwinding force of the tape. Therefore, the position of the harness is not always stable. For example, a part of the harness (a part of a wire bundle, a part of a shield member, or the like) may protrude to a point where the edges of the above notches intersect with each other. When the edges of the notches intersect with each other in a state where the part of the harness protrudes to the point where edges of the notches intersect with each other, the part of the harness may be caught between the fixed plate and the rotation plate. Further, if the rotation plate is continued to rotate as it is in a state where the harness is caught, the harness may be damaged or the harness may be broken in the worst case.

An object of the present invention is to provide a tape winding device, which can prevent a part of a harness from being caught between a fixed plate and a rotation plate, and improve the winding quality of a tape.

SUMMARY (1) According to one aspect of the present invention, a tape winding device includes a fixed plate disposed within a plane orthogonal to a longitudinal direction of a linear member, a rotation plate disposed adjacent to the fixed plate and configured to rotate within the plane orthogonal to the longitudinal direction of the linear member, a fixed plate side notch formed in a U shape running from an outer peripheral edge of the fixed plate toward a central region including a rotation axis of the rotation plate, a rotation plate side notch formed into a U shape running from an outer peripheral edge of the rotation plate toward a central region including the rotation axis of the rotation plate, the linear member to be inserted into or removed from the rotation plate side notch and the fixed plate side notch when a position of the rotation plate side notch is aligned with a position of the fixed plate side notch; a tape support unit configured to support a tape to be wound around the linear member and rotate together with the rotation plate with the linear member inserted in a bottom region of the fixed plate side notch and the rotation plate side notch, the bottom region including the rotation axis of the rotation plate; and a position regulating member disposed in a vicinity of a lateral side of the fixed plate and the rotation plate, the position regulating member to be positioned at a retracted position when the linear member is inserted into or removed from the fixed plate side notch and the rotation plate side notch, the position regulating member to be positioned at a regulation position after insertion of the linear member, and the position regulating member configured to regulate a position of the linear member in the fixed plate side notch and the rotation plate side notch such that the linear member is located at the bottom region of the fixed plate side notch and the rotation plate side notch.

(2) According to another aspect of the present invention, the tape winding device according to the one aspect may further include: a wiring board configured to hold the linear member in a fixed state; and a head unit configured to move straight along the linear member held by the wiring board. The head unit may include a slide member, the slide member being movable within a plane orthogonal to the linear member relative to the linear member held in the fixed state, the fixed plate and the rotation plate being mounted on the slide member, and the slide member configured to slide such that the linear member is inserted into or removed from the fixed plate side notch and the rotation plate side notch. The position regulating member may be located at a position corresponding to the fixed plate and the rotation plate when the fixed plate and the rotation plate are in an insertion position of the linear member relative to the fixed plate side notch and the rotation plate side notch, and the position regulating member being movable from the retracted position to the regulation position at the position.

(3) According to yet another aspect of the present invention, the tape winding device according to the one aspect or the another aspect may further include: a linear member holding mechanism provided on two sides of the fixed plate and the rotation plate in the longitudinal direction of the linear member, the linear member holding mechanism configured to hold the linear member in a vicinity of the rotation axis of the rotation plate when the linear member is inserted into the fixed plate side notch and the rotation plate side notch, and the rotation plate is being rotated.

According to the tape winding device of the one aspect, the linear member can be stably located at the bottom region of the notches of the fixed plate and the rotation plate by the position regulating member located at the regulation position. Therefore, a part of the linear member can be prevented from protruding to the intersection point of the edges of the notches, and a part of the linear member can be prevented from being caught between the fixed plate and the rotation plate. As a result, the winding quality of the tape can be improved.

According to the tape winding device of the another aspect, it is possible to regulate the position of the linear member by the position regulating member in accordance with the timing when the linear member is inserted into the notches of the fixed plate and the rotation plate. Therefore, the position regulating member does not interfere with insertion and removal of the linear member.

According to the tape winding device of the yet another aspect, the linear member can be held in the vicinity of the rotation axis of the rotation plate on both sides of the fixed plate and the rotation plate. Therefore, it is possible to prevent the linear member from moving wildly at the time of winding the tape. That is, since unwinding force of the tape acts on the harness in the tape winding step, the linear member is pulled toward a tape reel side. When the tape rotates together with the rotation plate with a greater extent of the pulling of the linear member, the linear member moves wildly like a skipping rope. Therefore, the linear member holding mechanism holds the linear member in the vicinity of the rotation axis of the rotation plate at two positions on the both sides of the fixed plate and the rotation plate, the two positions being starting points of the linear member moving. As a result, it is possible to prevent the linear member from moving wildly. As a result, the winding quality of the tape can be improved. Further, the load on the linear member during the tape winding operation can be reduced, and the contact between the linear member and equipment or the peripheral jigs can be eliminated. Therefore, noises and vibration can be reduced.

According to the present invention, it is possible to prevent a part of a harness from being caught between a fixed plate and a rotation plate. Therefore, the winding quality of the tape can be improved.

The present invention is briefly described above. Details of the present invention are further clarified by reading modes for carrying out the present invention described below (hereinafter, referred to as "embodiment") with reference to the accompanying drawings.

BRIEF DESCRIPTION OF DRAWINGS

FIGS. 6A and 6B are side views illustrating a configuration of a position regulating mechanism provided in the head unit, in which FIG. 6A is a view illustrating a state when a regulating arm as a position regulating member is in a retracted position, and in which FIG. 6B is a view illustrating a state when the regulating arm is in a regulating position;

FIGS. 8A and 8B are a illustrative views illustrating a problem that may occur when there is no position regulating mechanism, in which FIG. 8A is a perspective view illustrating a state where a position of a notch of a driven gear as a rotation plate is aligned with positions of notches of a support plate and an opposing plate as a fixed plate, in which FIG. 8B illustrates that a part Wx of an electric wire part W1 may be clamped when an edge of the notch of the driven gear and edges of the notches of the support plate and the opposing plate pass to intersect with each other due to rotation of the driven gear;

FIG. 12 is a perspective view illustrating another example of the linear member holding mechanism.

DESCRIPTION OF EMBODIMENTS

Figure 1:
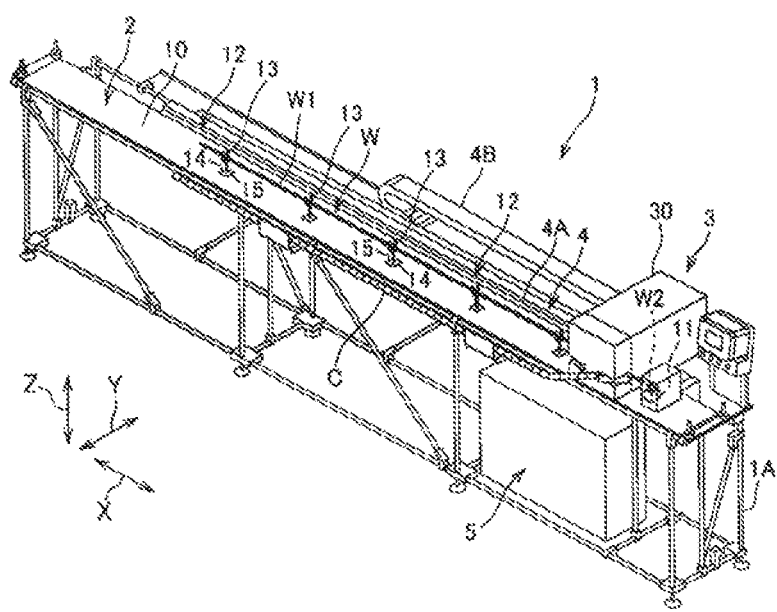
FIG. 1 is a perspective view illustrating an overall configuration of a tape winding device according to an embodiment of the present invention.
Figure 2:
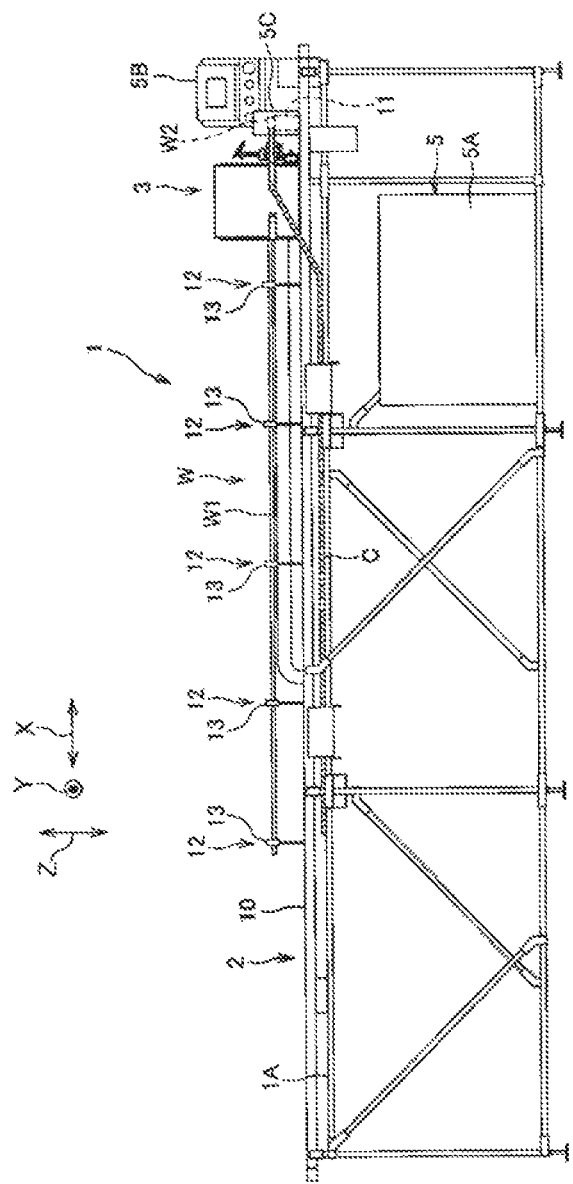
FIG. 2 is a front view illustrating the overall configuration of the tape winding device.

A specific embodiment of the present invention will be described below with reference to the drawings. FIG. 1 is a perspective view illustrating an overall configuration of a tape winding device according to an embodiment. FIG. 2 is a front view illustrating the overall configuration of the tape winding device.

A tape winding device 1 of the present embodiment winds a tape T around an electric wire part W1 of a wire harness W in a manufacturing process of the wire harness W. In addition, the tape winding device 1 winds the tape T around an outer periphery of a corrugated tube C after the corrugated tube C is attached to an outer periphery of the electric wire part W1 as an exterior member. Here, descriptions of attachment of the corrugated tube C will be omitted, and only winding of the tape T will be described. A winding object of the tape T is the electric wire part W1 of the wire harness W or a part of the electric wire part W1 to which the corrugated tube C is attached. In the following descriptions, these winding objects may be simply referred to as "harnesses W1".

Hereinafter, for convenience of descriptions, a longitudinal direction of the wire harness W is referred to as an X direction, a horizontal direction orthogonal to the X direction is referred to as a Y direction, and a vertical direction is referred to as a Z direction. One side in the X direction (right side in FIGS. 1 and 2) is referred to as an upstream side, and the other side in the X direction (left side in FIGS. 1 and 2) is referred to as a downstream side. In addition, one side in the Y direction (front side in FIGS. 1 and 2) is referred to as a front side, and the other side in the Y direction (back side in FIGS. 1 and 2) is referred to as a back side. Therefore, as for a movement in the Y direction, a movement toward the front side is referred to as forward movement, and a movement toward the back side is referred to as backward movement.

The wire harness W includes an elongated electric wire part W1 and a connector W2 fixed to a terminal of the electric wire part W1. The corrugated tube C is mounted on the electric wire part W1 as necessary. Therefore, the electric wire part W1 or a part of the electric wire part W1 to which the corrugated tube C is attached corresponds to a linear member (harness W1) as a winding object of a tape. The wire harness W as a tape-wound product is used, for example, for transmitting a high-voltage current from a power source in an electric vehicle or the like. Alternatively, the wire harness W can also be used for transmitting a low-voltage current in a general automobile, which is not limited to the electric vehicle.

An example of the electric wire part W1 includes a shielded electric wire which includes a conductor formed of a twisted wire or the like obtained by twisting a plurality of wires, a covering portion that covers the conductor, and a shield portion formed of a braid or the like covering the covering portion. However, other electric wires may be used. In addition, as the electric wire part W1 of the wire harness W of the present embodiment, an electric wire formed of one electric wire that does not have a branch in the middle thereof is illustrated. However, the electric wire part W1 may be a bundle of a plurality of electric wires, or may include a branched electric wire branched from a plurality of electric wires.

The corrugated tube C is formed of a synthetic resin or the like in an elongated tubular shape, and includes a slit cut in a peripheral wall thereof along a longitudinal direction. That is, a part of an annular cross section in the corrugated tube C is cut by the slit, and the cross section is elastically deformed into a C shape by opening the slit. Therefore, the electric wire part W1 of the wire harness W can be inserted into the corrugated tube C from the opened slit part. With this insertion, the corrugated tube C can be attached to the wire harness W so as to cover an outer part of the electric wire part W1.

The tape T is, for example, an adhesive tape obtained by applying an adhesive to a polyvinyl chloride (PVC) substrate, and is prepared in a form of a roll obtained by winding and piling the tape around a core formed of a paper tube or the like. The tape T is wound directly around the outer periphery of the electric wire part W1 of the wire harness W, and is wound around the outer periphery of the corrugated tube C attached to the electric wire part W1.

The tape T is wound around the electric wire part W1 in a rough spiral shape in which the tape T does not overlap with each other, for example. The tape T protects the electric wire part W1 by the rough winding of the tape T such that the shield portion (braid) is not clamped by the slit of the corrugated tube C. In addition, the tape T is wound around the corrugated tube C to overlap each other by about a half width. With this lap winding, the tape T reliably closes the slit of the corrugated tube C to ensure protection performances of the corrugated tube C.

The configuration of the tape winding device 1 is described below. As illustrated in FIGS. 1 and 2, the tape winding device 1 of the present embodiment includes a wiring device 2, a head unit 3 as a device body for tape winding, a body drive unit 4, and a device control unit 5.

The wiring device 2 is disposed on a support base 1A, and holds the wire harness W thereon. The head unit 3 is located on an upper side of the wiring device 2, and is movable along the longitudinal direction of the wire harness W (left-right direction in FIG. 1, i.e., X direction). The body drive unit 4 is provided as a moving unit which reciprocates the head unit 3 in the X direction. The device control unit 5 drives and controls units of the wiring device 2 and the head unit 3 and the body drive unit 4.

As illustrated in FIGS. 1 and 2, the wiring device 2 includes a wiring board 10, a connector holding unit 11, and a plurality of wiring jigs 12. The wiring board 10 is formed into a plate shape elongated in the X direction, and is disposed on the support base 1A in a horizontal state. The connector holding unit 11 is provided at an end portion of the wiring board 10 on an upstream side in the X direction and includes a part to be fitted to the connector W2 of the wire harness W.

The plurality of wiring jigs 12 support the electric wire part W1 of the wire harness W, and are provided at appropriate intervals on the middle part of the wiring board 10 toward the downstream side in the X direction. Each of the wiring jigs 12 includes a fork-shaped locking claw portion 13 in which a tip end is opened upward and into which the electric wire part W1 can be inserted, and a jig drive unit 14 provided on a base side (lower side) of the locking claw portion 13. Each of the wiring jigs 12 is projected and retracted from an upper surface of the wiring board 10 through a hole 15 formed in the wiring board 10.

Figure 3:
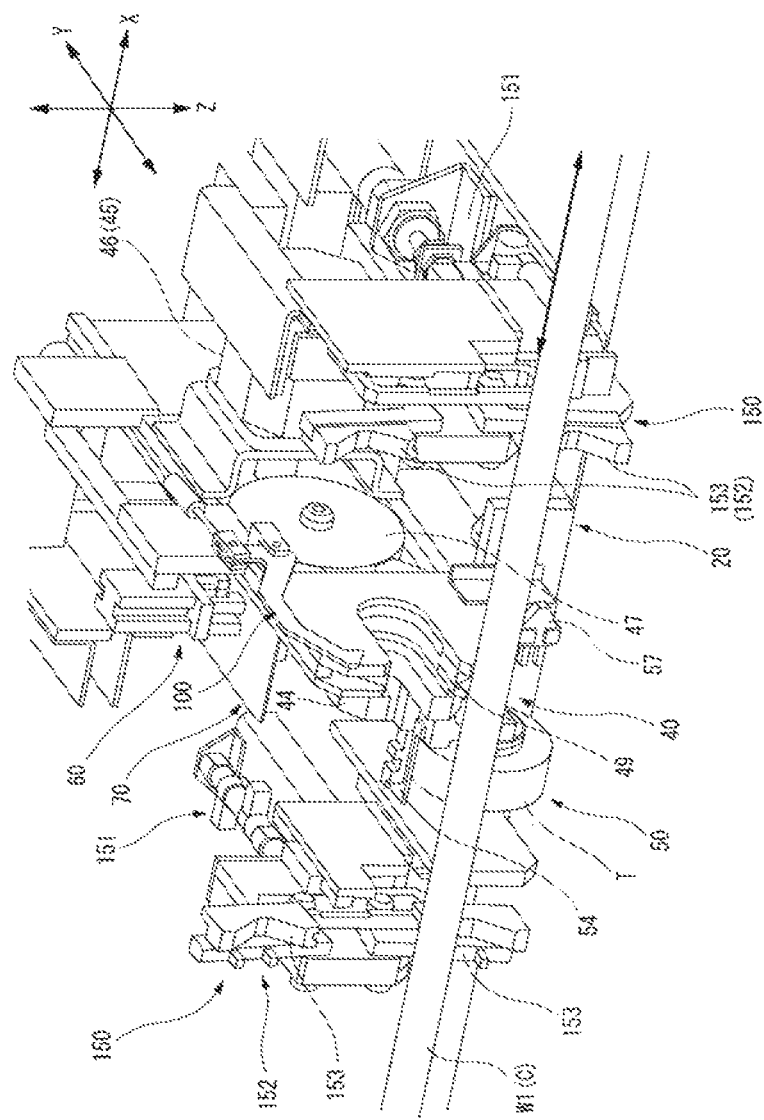
FIG. 3 is a perspective view illustrating a configuration of a head unit with a part thereof omitted in the tape winding device.
Figure 4:
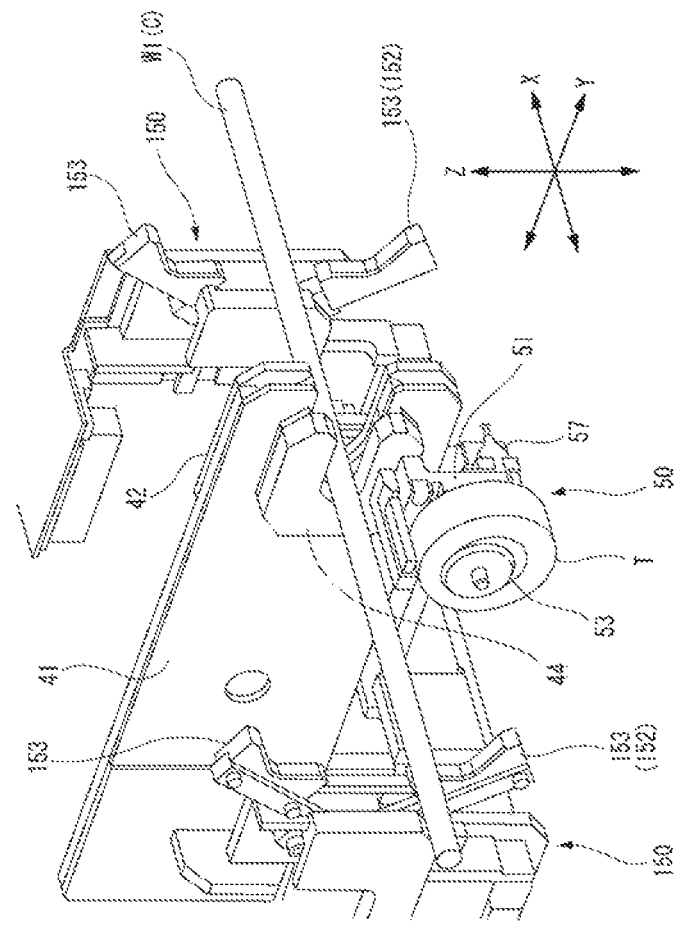
FIG. 4 is a perspective view taken from a direction opposite to FIG. 3, which illustrates the configuration of the head unit with a part thereof omitted.

FIG. 3 is a perspective view schematically illustrating an internal configuration of the head unit 3. FIG. 4 is a perspective view taken from a direction opposite to that of FIG. 3, and shows an outline of the internal configuration of the head unit 3. Note that, illustrations of parts that are not required to be described in detail particularly are simplified or omitted in FIGS. 3 and 4.

The head unit 3 as the device body includes a base 20 supported by the body drive unit 4 and a case 30 (see FIG. 1) supported by the base 20. As illustrated in FIG. 3, the base 20 is provided with a turning unit 40, a sticking unit 60, and a cutting unit 70. The turning unit 40, the sticking unit 60, and the cutting unit 70 are provided inside the case 30 which is not illustrated in FIG. 3.

The turning unit 40 turns the tape T around the harness W1 within a plane orthogonal to the harness W1. The sticking unit 60 sticks the tape T to a surface of the harness W1. The cutting unit 70 cuts the tape T wound around the harness W1 at a terminal position.

As illustrated in FIGS. 1 and 2, the body drive unit 4 includes a guide rail 4A, a linear motor (not illustrated), and an electric wire guide 4B. The guide rail 4A serves to support and guide the base 20 of the head unit 3. The linear motor moves the head unit 3 in a sliding manner along the guide rail 4A. The electric wire guide 4B guides an electric wire such as power lines and signal lines to be connected to the head unit 3 from the device control unit 5. The guide rail 4A extends along a longitudinal direction (X direction) of the wiring board 10, and guides the head unit 3 in a sliding manner in the X direction by drive of the linear motor. The electric wire guide 4B protects the electric wire routed from the device control unit 5 to the head unit 3, and can bend or stretch to guide the electric wire such that there is no tension or slack with the sliding of the head unit 3.

As illustrated in FIGS. 3 and 4, the turning unit 40 and a position regulating mechanism 100 (described below), which are movable in the Y direction, are supported by the base 20 being slidable in the X direction. The turning unit 40 and the position regulating mechanism 100 are mounted on a slide member which is driven to move forward or backward along the Y direction by a drive device (not illustrated). The sticking unit 60 and the cutting unit 70 are supported by the base 20 so as to be movable in the Y direction. The sticking unit 60 and the cutting unit 70 are driven to move forward or backward along the Y direction, independent of the turning unit 40, by a drive device (not illustrated). Linear member holding mechanisms 150 (described below) are supported by the base 20, and are respectively located at two sides of the turning unit 40 in the X direction (two sides of the wire harness W in the longitudinal direction). A holding head 152 of the linear member holding mechanism 150 is driven to move forward or backward along the Y direction, independent of the turning unit 40, by a drive device 151.

Figure 5:
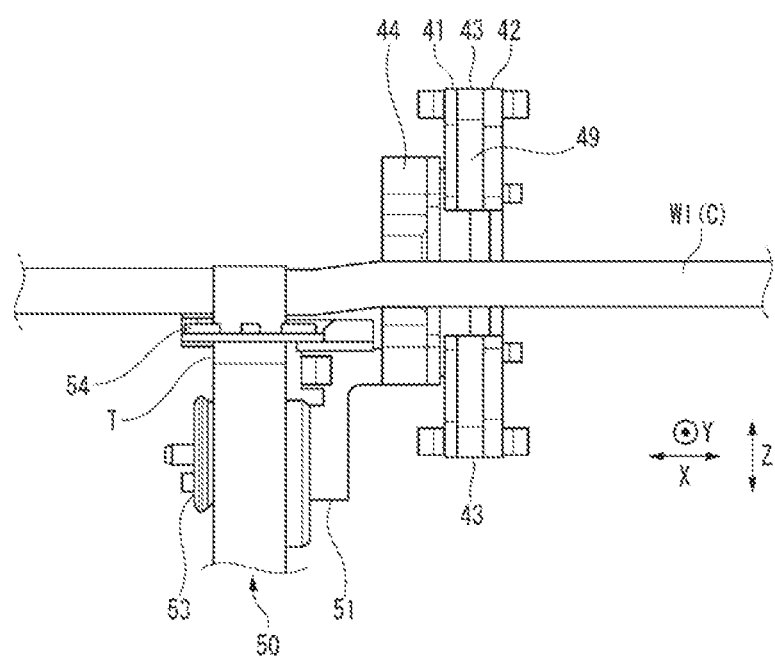
FIG. 5 is a front view illustrating a main configuration of the head unit.
Figure 6A:
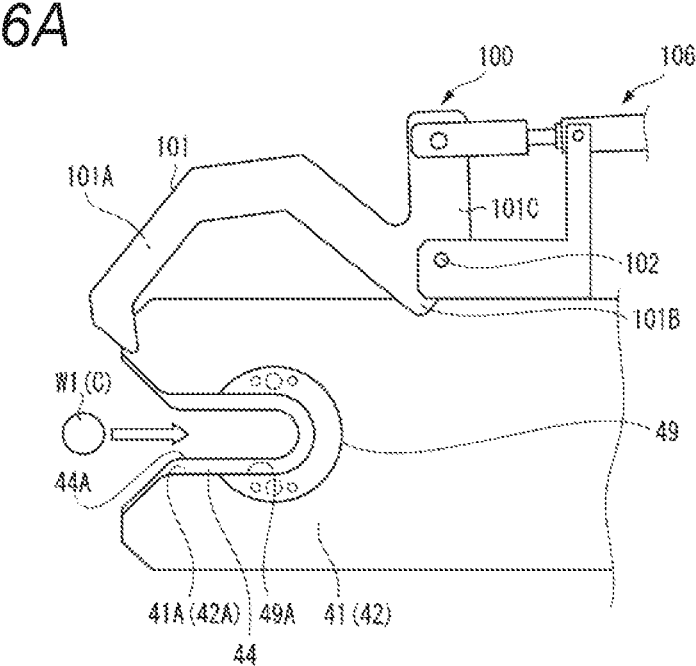
Figure 6B:
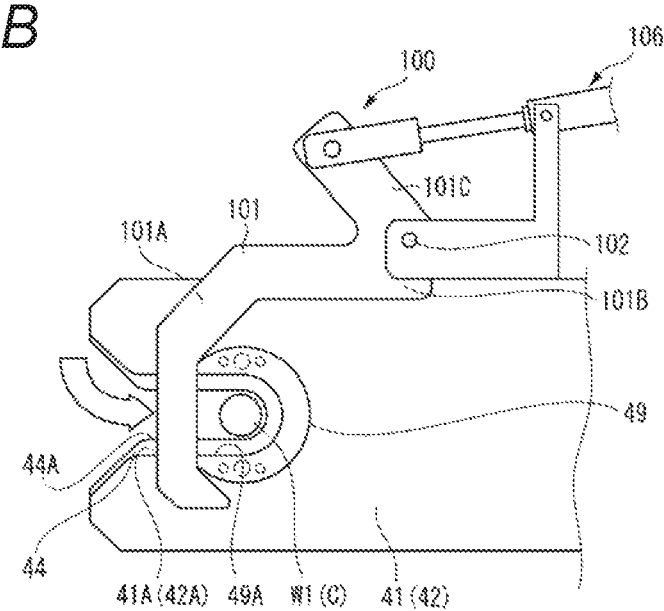
Figure 7:
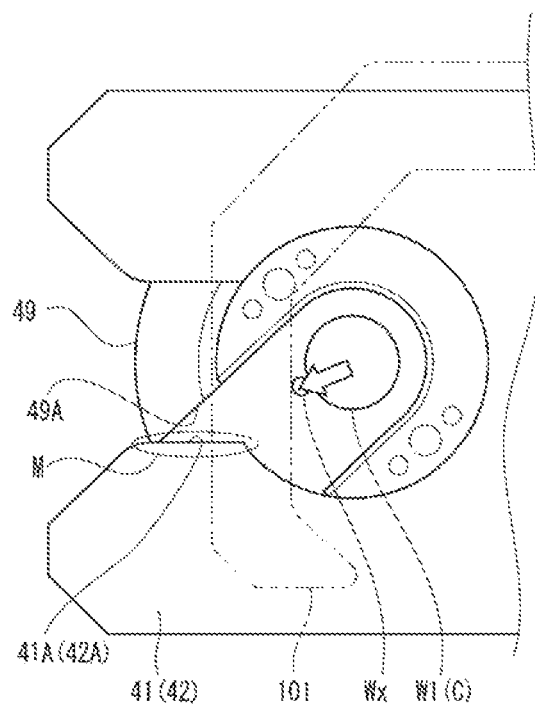
FIG. 7 is an illustrative view illustrating operation and effects of the position regulating mechanism.
Figure 8A:
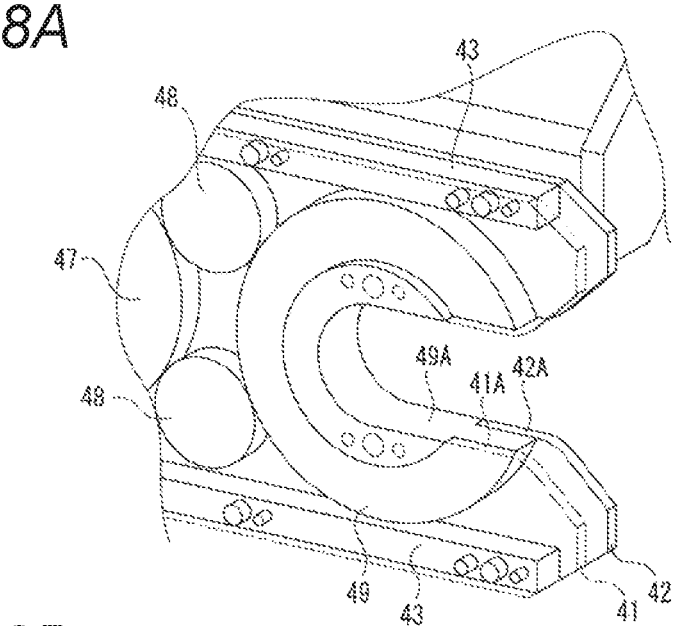
Figure 8B:
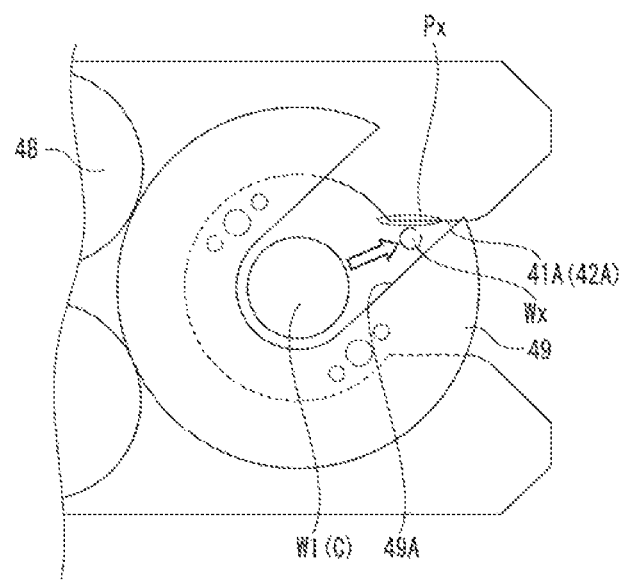

FIG. 5 is a front view illustrating a main configuration of the head unit 3. FIGS. 6A and 6B are side views illustrating a configuration of the position regulating mechanism 100 provided in the head unit 3. FIG. 6A is a view illustrating a state when a regulating arm 101 as a position regulating member is in a retracted position. FIG. 6B is a view illustrating a state when the regulating arm 101 is in a regulation position. FIG. 7 is an illustrative view of operation and effects of the position regulating mechanism 100. FIGS. 8A and 8B are illustrative views illustrating a problem which may be caused when there is no position regulating mechanism 100. FIG. 8A is a perspective view illustrating a state where a position of a notch 49A of a driven gear 49 as a rotation plate is aligned with positions of notches 41A and 42A of a support plate 41 and an opposing plate 42 as fixed plates. FIG. 8B is a view illustrating that a part Wx of the electric wire part W1 may be clamped when an edge of the notch 49A of the driven gear 49 and edges of the notches 41A and 42A of the support plate 41 and the opposing plate 42 pass to intersect with each other due to rotation of the driven gear 49.

The configurations of the turning unit 40 and the position regulating mechanism 100 will be described with reference to FIG. 5, FIGS. 6A and 6B, FIG. 7, and FIGS. 8A and 8B together with FIGS. 3 and 4. The turning unit 40 includes the support plate 41, the opposing plate 42, upper and lower spacers 43, a rotation panel 44, a rotation drive unit 45, and a tape support unit 50. The support plate 41 is disposed in a plane (Y-Z plane) orthogonal to the longitudinal direction of the harness W1, and is supported by the base 20 so as to be slidable in the Y direction. The support plate 41 is a cantilever, the tip end of which extending toward the front side in the Y direction. The opposing plate 42 is fixed to a tip end part of the support plate 41, the opposing plate 42 being separated from the support plate 41 at a predetermined distance in the X direction (plate thickness direction). The upper and lower spacers 43 are interposed between the support plate 41 and the opposing plate 42 to hold the distance between the plates constant. The rotation panel 44 is disposed on a side of the support plate 41 opposite to the opposing plate 42 via a shim plate. The tape support unit 50 which supports the tape T is connected to the rotation panel 44 via a bracket 51.

The rotation drive unit 45 drives the rotation panel 44 to rotate, and includes a rotation motor 46, a drive gear 47, a pair of upper and lower intermediate gears 48, and the driven gear 49. The rotation motor 46 is fixed to the support plate 41. The drive gear 47 is axially supported by the support plate 41 and meshes with an output gear of the rotation motor 46. The upper and lower intermediate gears 48 are axially supported by the support plate 41 and mesh with the drive gear 47. The driven gear 49 is supported between the support plate 41 and the opposing plate 42 to be rotatable, and meshes with the pair of upper and lower intermediate gears 48. The rotation panel 44 is connected to the driven gear 49. The rotation panel 44 and the driven gear 49 rotate within a plane (Y-Z plane) orthogonal to the longitudinal direction of the harness W1.

With the above configuration, when the rotation motor 46 rotates, the driven gear 49 is driven to rotate via the drive gear 47 and the intermediate gears 48, and the rotation panel 44 rotates together with the driven gear 49.

Here, the support plate 41 and the opposing plate 42 do not rotate, and thus they correspond to fixed plates. In addition, the driven gear 49 disposed between the support plate 41 and the opposing plate 42, and the rotation panel 44 disposed outside the support plate 41 and the opposing plate 42 rotate, and thus they correspond to a rotation plate. The driven gear 49 and the rotation panel 44 are disposed adjacent to the support plate 41 and the opposing plate 42.

The support plate 41 and the opposing plate 42 have U-shaped notches 41A and 42A at the tip end sides (front side in the Y direction), respectively. The notches 41A and 42A (fixed plate side notches) of the support plate 41 and the opposing plate 42 are formed into U shapes extending from outer peripheral edges of the respective plates 41, 42 toward central regions including rotation axes of the driven gear 49 and the rotation panel 44 (rotation plate).

The driven gear 49 and the rotation panel 44 also have U-shaped notches 49A and 44A. The notches 49A and 44A of the driven gear 49 and the rotation panel 44 (rotation plate side notches) are formed into U shapes extending from outer peripheral edges of the driven gear 49 and the rotation panel 44 (rotation plate) toward central regions including the rotation axes of the driven gear 49 and the rotation panel 44.

When positions of the notches 49A and 44A of the driven gear 49 and the rotation panel 44 are aligned with positions of the notches 41A and 42A of the support plate 41 and the opposing plate 42 by the rotation, the harnesses W1 are inserted into/removed from notches 41A, 42A, 44A, and 49A.

The driven gear 49 is driven to rotate by meshing with the pair of intermediate gears 48, so that when the notch 49A passes one intermediate gear 48, meshing with the other intermediate gear 48 is still ensured. Therefore, the rotation driving of the driven gear 49 is not hindered by the notch 49A.

The tape support unit 50 includes the bracket 51, a tape holder 53, and a tape chuck 54. The bracket 51 is connected to the rotation panel 44, and the tape holder 53 is connected to the bracket 51. Further, a tape support shaft of the tape holder 53 is inserted into a winding core ring of the tape T. The tape chuck 54 is provided as a unit which holds an end of the tape T.

As illustrated in FIG. 4, a sensor 57, which detects a rotation position of the tape support unit 50, is provided at a tip end of the support plate 41. The sensor 57 detects the rotation position of the tape support unit 50, and thereby stop positions of the driven gear 49 and the rotation panel 44 are controlled. That is, rotation is stopped at a position where the tape T is located lower than the harness W1 and the notches 44A and 49A of the rotation panel 44 and the driven gear 49 faces the same direction (the front side in the Y direction) as the notches 41A and 42A of the support plate 41 and the opposing plate 42.

When the driven gear 49 and the rotation panel 44 rotate in a state where the harness W1 is inserted into bottom regions of the notches 41A, 42A, 44A, and 49A, the tape T supported by the tape support unit 50 turns around the harness W1. The tape T is wound around the harness W1 by this turning.

The above turning unit 40 reciprocates in the Y direction. Specifically, the turning unit 40 is driven to move forward or backward between the retracted position and advancement position. When the turning unit 40 is in the retracted position, the harness W1 is not inserted into the notches 41A, 42A, 44A, and 49A of the support plate 41, the opposing plate 42, the rotation panel 44, and the driven gear 49. That is, the tape T of the tape support unit 50 is positioned at a back side of the harness W1 in the Y direction. When the turning unit 40 is in the advancement position, the harness W1 is inserted into the notches 41A, 42A, 44A, and 49A, and the tape T is located below the harness W1. This is the advancement position or in other words a winding position.

The sticking unit 60 pulls out the end of the tape T and puts the tape T onto a surface of the harness W1. The cutting unit 70 cuts an end portion of the wound tape T after the winding process of the tape T is performed. The sticking unit 60 and the cutting unit 70 move forward at a necessary timing from the retracted position on the rear side, and move backward to the retracted position after predetermined working operation is performed.

Next, the position regulating mechanism 100 is described. As illustrated in FIGS. 6A and 6B, the position regulating mechanism 100 is disposed at a lateral side of the support plate 41 or the opposing plate 42, or at a lateral side of the rotation panel 44. In the present embodiment, since the tape support unit 50 is provided on the lateral side of the rotation panel 44 and interferes with position regulating mechanism 100, the position regulating mechanism 100 is disposed in the vicinity of the lateral side of the support plate 41 or the opposing plate 42 on the side opposite to the rotation panel 44. The position regulating mechanism 100 regulates the position of the harness W1 such that the harness W1 is located in the bottom regions of the notches 41A, 42A, 44A, and 49A, and includes the regulating arm 101 as a position regulating member.

The regulating arm 101 has a bell crank shape, and a distal end arm portion 101A is curved in a hook shape. The regulating arm 101 is connected to the support plate 41 or the opposing plate 42 by a support shaft 102 at a bent portion 101B so as to be rotatable in an upper-lower direction. A base end arm portion 101C of the regulating arm 101 is connected to a tip end of a rod of an air cylinder 106. Further, when the air cylinder 106 is actuated, the regulating arm 101 is rotated between the retracted position illustrated in FIG. 6A and a regulation position illustrated in FIG. 6B.

When the regulating arm 101 is in the retracted position illustrated in FIG. 6A, the insertion and removal of the harness W1 relative to the notches 41A, 42A, 44A, and 49A is not regulated. When the regulating arm 101 is in the regulation position illustrated in FIG. 6B, the distal end arm portion 101A blocks a path for the harness W1 to fall off from the notches 41A, 42A, 44A, and 49A. Therefore, the harness W1 can be retained in the bottom region of the notches 41A, 42A, 44A, and 49A.

When the turning unit 40 is in the advancement position (insertion position of the harness W1 relative to the notches 41A, 42A, 44A, and 49A), the regulating arm 101 is rotated between the retracted position illustrated in FIG. 6A and the regulation position illustrated in FIG. 6B.

Next, the linear member holding mechanisms 150 are described. The linear member holding mechanisms 150 are disposed on two sides of the turning unit 40 in the X direction (two sides in the longitudinal direction of the harness). The linear member holding mechanisms 150 hold the harness W1 at a position close to a rotation axis when the rotation panel 44 rotates in a state where the harness W1 is inserted into the notches 41A, 42A, 44A, and 49A.

The linear member holding mechanism 150 includes the drive device 151 provided on the base 20 and the holding head 152 which is driven to move forward or backward in the Y direction by the drive device 151. A pair of upper and lower regulating members 153 are provided on the holding head 152 such that the pair of upper and lower regulating members 153 opens and closes. The pair of upper and lower regulating members 153 are closed by an opening/closing drive device (not illustrated) in a state where the holding head 152 is moved forward. The harness W1 is inserted into the regulating hole portion disposed at the mating portion of the pair of upper and lower regulating members when the pair of upper and lower regulating members 153 are closed, and thereby the pair of upper and lower regulating members 153 hold the harness W1 in the vicinity of the rotation axis of the rotation panel 44.

Next, the operation of the tape winding device 1 is described. The tape winding operation includes an operation of winding the tape T directly around the wire portion W1 of the wire harness W, and an operation of winding the tape T around the corrugated tube C. The two operations are the same except that a winding pitch is changed. Therefore, the winding object is to be referred to as the harness W1 here, and the operation of winding the tape T around the harness W1 is described.

The steps of the winding operation include an draw-out step (draw-out operation), a sticking step (sticking operation), a winding step (winding operation), and a cutting step (cutting operation), which are executed in order. The draw-out step refers to a step of pulling out the end of the tape T from a roll of tape T supported by the tape support unit 50. The sticking step refers to a step of sticking the end of the drawn out tape T to the outer periphery of the harness W1. The winding step refers to a step of turning and winding the tape T around the harness W1. The cutting step refers to a step of cutting an end portion of the tape T to have wound around the harness W1.

In order to perform the winding of the tape T, a preparation step is performed prior to the winding operation. The preparation step is performed by an operator in a state where each part of the tape winding device 1 is returned to an initial position. As illustrated in FIGS. 1 and 2, an initial position of the head unit 3 is a position on the upstream side of the wiring board 10. At the initial position of the head unit 3, the turning unit 40, the sticking unit 60, and the cutting unit 70 are in the retracted position. As for the wiring device 2, the plurality of wiring jigs 12 protrude from the upper surface of the wiring board 10.

In the preparation step, first, the tape T is set on the tape support unit 50 of the head unit 3, and the end thereof is held by the tape chuck 54 so as to protrude upward. Further, the wire harness W is placed on the wiring board 10, the connector W2 is fitted to the connector holding unit 11, and the electric wire part W1 (harness W1) is fastened to the locking claw portions 13 of the plurality of wiring jigs 12.

When the above preparation step is completed, the operator operates the switch for controlling operation, thereby starting the winding operation. The control unit, which has received signals from the switch, performs the draw-out step and the sticking step on the electric wire part W1 (harness W1) in the vicinity of the connector W2 on one end side (upstream side) of the wire harness W, and then performs the winding step of winding the electric wire part W1 toward the downstream side thereof.

The first draw-out step is performed in a state where the turning unit 40, the sticking unit 60, and the cutting unit 70 are in the retracted position, that is, in a state where the tape T of the tape support unit 50 is located at the back side of the harness W1 in the Y direction. In the draw-out step, first, the sticking unit 60 pulls out the end of the tape T by gripping and lifting the end of the tape T.

By the turning unit 40 moving forward under this state, the harnesses W1 is inserted into the notches 41A, 42A, 44A, and 49A of the turning unit 40. In the sticking step, the end of the drawn out tape T is stuck to the surface of the harness W1 by the sticking unit 60 pushing the end of the tape T toward in the front side in the Y direction. Thereafter, the gripping of the tape T is released. The sticking step is completed, and then the sticking unit 60 is retracted.

Next, in the winding step, the turning unit 40 rotates the driven gear 49 and the rotation panel 44 from the state where the end of the tape T is stuck to the electric wire part W1. The tape T supported by the tape support unit 50 turns around the electric wire part W1 by the rotation of the rotation panel 44.

As described above, when the tape T starts turning by the turning unit 40, the body drive unit 4 moves the base 20 of the head unit 3 to the downstream side in the X direction by the linear motor at the same time or after a predetermined time of the tape T starting turning. With the movement of the head unit 3, the tape T moves toward the downstream side in the longitudinal direction of the harness W1 as being turned by the turning unit 40, and is spirally wound around the harness W1.

When the winding of the tape T is completed for a predetermined length, the movement of the head unit 3 is stopped, and the turning unit 40 stops the rotation of the rotation panel 44. The stop position of the rotation panel 44 is controlled by a signal of the sensor 57. That is, when rotation is stopped, the tape T is positioned below the harness W1, and the notches 44A and 49A of the rotation panel 44 and the driven gear 49 face the same direction as the notches 41A and 42A of the support plate 41 and the opposing plate 42. Therefore, when the rotation of the tape T is stopped, the winding end portion of the tape T extends from a back side surface of the harness W1 in the Y direction toward the tape chuck 54 positioned below the harness W1.

In the cutting step, the cutting unit 70 pushes out the cutting blade and cuts the winding end portion of the tape T, and at the same time, sticks the winding end portion to the harness W1 reliably.

Figure 9:
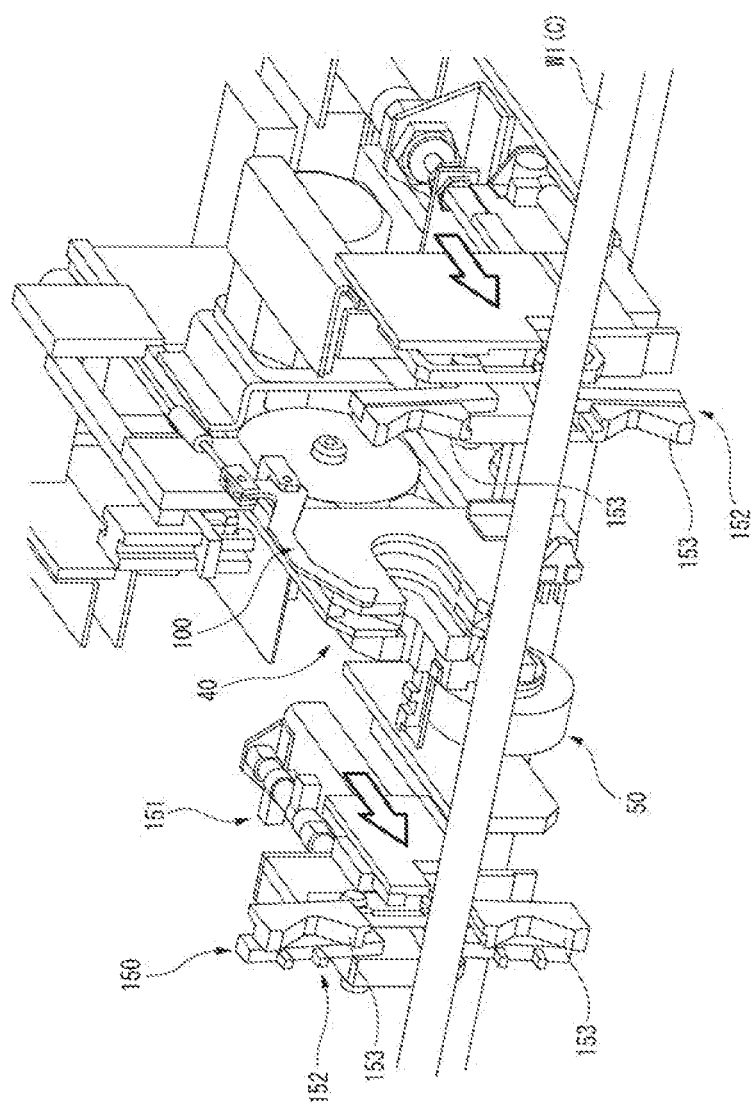
FIG. 9 is a view illustrating operation of a linear member holding mechanism provided in the head unit, and is a perspective view illustrating a state where a holding head of a linear member holding mechanism is moved forward to a position, where the electric wire part W1 of the wire harness is held, prior to a forward movement of a turning unit.
Figure 10:
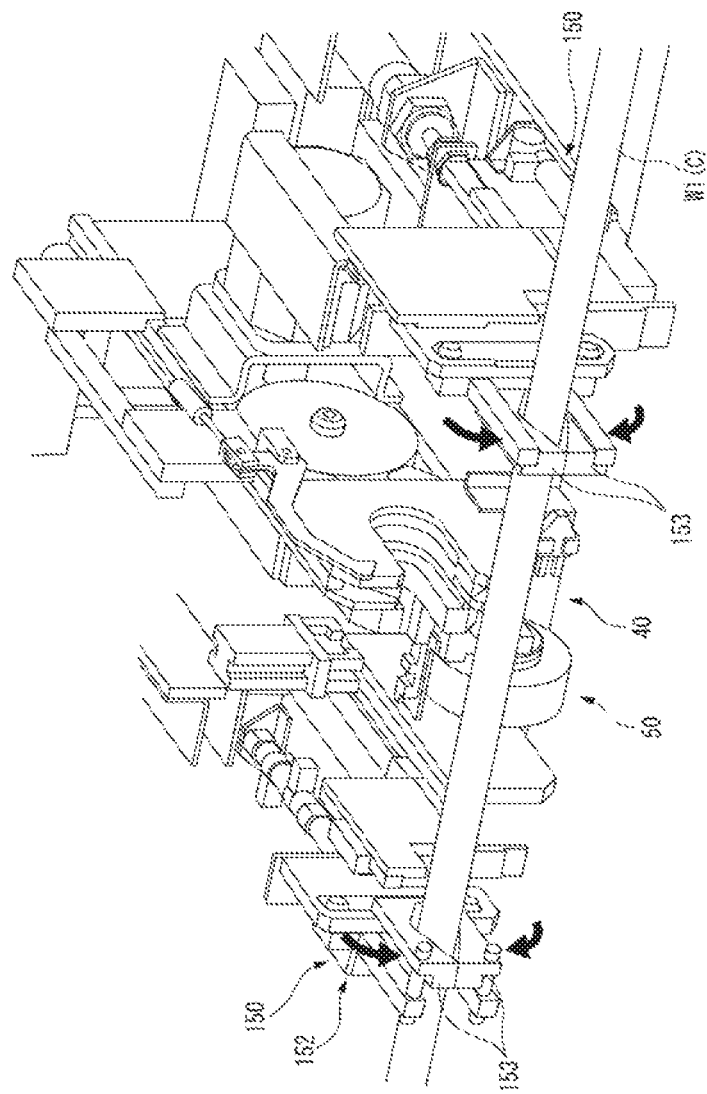
FIG. 10 is a perspective view illustrating a state where a holding arm of the linear member holding mechanism is closed and the electric wire W1 of the wire harness is held in a suitable place, as the next stage of FIG. 9.

Next, operations of the linear member holding mechanism 150 and the position regulating mechanism 100 that regulate the position of the harness W1 are described. In the above series of steps, the holding head 152 of the linear member holding mechanism 150 moves forward as illustrated in FIG. 9 before the turning unit 40 moves forward from the retracted position. Further, as illustrated in FIG. 10, when the upper and lower regulating members 153 are closed at the advancement position, the harness W1 is accommodated in a regulating hole portion (guide hole portion) disposed at the mating portion of the regulating members 153. Here, the size of the regulating hole portion is set to be slightly larger than a diameter of the harness W1. Accordingly, it is possible to prevent excessive friction between the harness W1 and the regulating members 153 due to the movement of the head unit 3.

Figure 11:
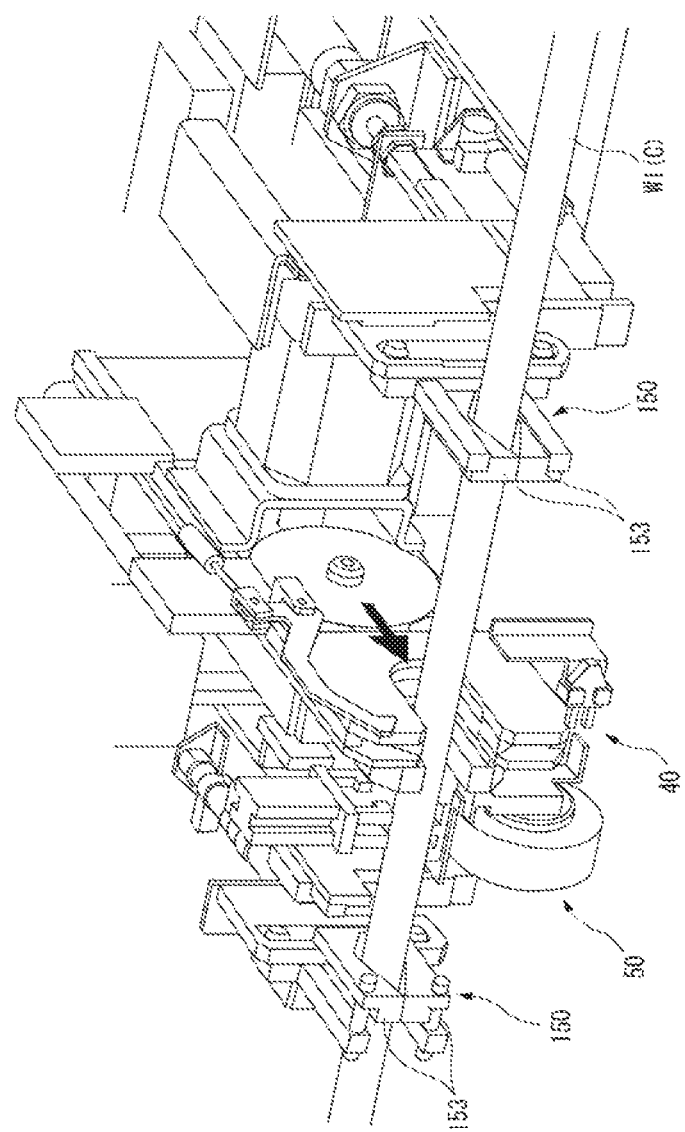
FIG. 11 is a perspective view illustrating a state where the turning unit moves forward and the electric wire part W1 of the wire harness is inserted into each notch of the driven gear, the rotation plate, the support plate, and the opposing plate, as the next stage of FIG. 10.

As described above, when the harness W1 is accommodated in the regulating hole portion secured at the mating portion of the regulating members 153, the harness W1 can be held in the vicinity of the rotation axis of the rotation panel 44 on both sides of the turning unit 40. Therefore, when the winding of the tape T is performed by the turning unit 40 in a state where the turning unit 40 moves forward as illustrated in FIG. 11, it is possible to prevent the harness W1 from moving wildly.

That is, since unwinding force of the tape T acts on the harness W1 in the tape winding step, the harness W1 is pulled toward a tape reel side. When the tape T rotates together with the rotation plate 44 with a greater extent of the pulling of the harness W1, the harness W1 moves wildly like a skipping rope. Therefore, the regulating members 153 of the linear member holding mechanism 150 holds the harness W1 in the vicinity of the rotation axis of the rotation panel 44 at two positions on the both sides of the turning unit 40, the two positions being starting points of the harness W1 moving. Accordingly, it is possible to prevent the harness W1 from moving wildly.

As a result, the winding quality of the tape T can be improved. In addition, the load on the harness W1 during the tape winding operation can be reduced, and the contact between the harness W1 and equipment or peripheral jigs can be eliminated. Therefore, noises and vibration can be reduced.

When the harness W1 is loose due to own weight thereof or an excess length, it may be difficult to put the harness W1 into the notches 41A, 42A, 44A, and 49A of the turning unit 40. However, this situation may be improved. That is, the harness W1 is picked up by the regulating members 153 of the linear member holding mechanisms 150 on two sides before the turning unit 40 is moved forward. Accordingly, the position of the harness W1 can be stabilized, and the harness W1 can be reliably inserted into the notches 41A, 42A, 44A, and 49A of the turning unit 40.

The position regulating mechanism 100 rotates the regulating arm 101 as illustrated in FIG. 6B in a state where the turning unit 40 is moved forward and the harness W1 is inserted into the notches 41A, 42A, 44A, and 49A of the turning unit 40. Accordingly, the distal end arm portion 101A of the regulating arm 101 blocks the path of the harness W1 for falling off. As a result, the harness W1 can be stably positioned at the bottom region in the notches 41A, 42A, 44A, and 49A.

Therefore, as illustrated in FIG. 7, a part Wx of the harness W1 can be prevented from protruding to an intersection point M of edges of the notches 41A, 42A, and 49A. That is, the part Wx of the harness W1 may not be caught between the support plate 41 and the opposing plate 42 and the driven gear 49. As a result, the winding quality of the tape T can be improved.

This aspect will be described in comparison with the case where there is no position regulating mechanism 100. As illustrated in FIG. 8A, in the tape winding device 1, the driven gear 49 (rotation plate) including the U-shaped notch 49A is rotated at a position adjacent to the support plate 41 and the opposing plate 42 (fixed plate) including the U-shaped notches 41A and 42A. The rotation panel 44 is slightly separated from the support plate 41 or the opposing plate 42. Therefore only a problem with the driven gear 49 is to be described here.

As illustrated in FIG. 8B, during rotation of the driven gear 49, one edge of the U-shaped notches 41A and 42A of the support plate 41 and the opposing plate 42 and one edge of the U-shaped notch 49A of the driven gear 49, the edges facing each other along the rotation direction, intersect with each other at some point.

Meanwhile, when the driven gear 49 is being rotated, the harness W1 is located at the bottom region in the notches 41A, 42A, and 49A and the harness W1 is always subjected to the unwinding force of the tape T. Therefore, the position of the harness W1 is not always stable. For example, the part Wx (a part of the wire bundle, a part of the shield member, or the like) of the harness W1 may protrude to a point Px where the edges of the notches 41A, 42A, and 49A intersect with each other. When the edges of the notches 41A, 42A, and 49A intersect with each other in a state where the part Wx of the harness W1 protrudes to the point Px where edges of the notches 41A, 42A, and 49A intersect with each other, the part Wx of the harness W1 may be caught between the support plate 41 and the opposing plate 42 and the driven gear 49. Then, when the rotation of the driven gear 49 is continued as it is in a state where the harness W1 is caught, the harness W1 may be damaged or the harness W1 may be broken in the worst case.

Such a problem can be solved by providing the position regulating mechanism 100. As a result, a product with good quality can be provided.

The present invention is not limited to the above embodiment, and includes other configurations and the like which can achieve the object of the present invention, and the following modifications and the like are also contained in the present invention.

For example, as illustrated in FIG. 12, the upper and lower regulating members 173 and 174 of the linear member holding mechanism 170 may be constituted by rollers.

A regulating member which slides straight may be provided instead of the rotation regulating arm 101 of the position regulating mechanism 100. In addition, the position where the regulating arm 101 and the regulating member are provided may be set at any position as long as the) are set at a position where the path for the harness W1 to fall off from the notches 41A, 42A, 44A, and 49A can be blocked.

The directions of openings of the U-shaped notches 41A, 42A, 44A, and 49A are not limited to a horizontal direction, and may be set optionally in accordance with a moving direction of the turning unit 40. For example, the moving direction of the turning unit 40 may be set in the upper-lower direction, and the directions of the openings of the U-shaped notches 41A, 42A, 44A, and 49A may be set downward. In this case, regulating arm 101 and the regulating member of the position regulating mechanism 100 may be set at a position where the openings of the notches 41A, 42A, 44A, and 49A can be closed.

In the above embodiment, the wire harness W is held on the wiring board 10 of the wiring device 2 so as not to be movable, and the head unit 3 is reciprocated along the wiring board 10. However, the present invention is not limited thereto, and the wire harness W may be moved relative to the head unit 3 which is not movable, or the wire harness W and the head unit 3 may be moved relative to each other by moving the wire harness W and the head unit 3 separately.

In addition, the best configuration, method and the like for carrying out the present invention have been disclosed in the above description, but the present invention is not limited thereto. That is, although the invention has been particularly illustrated and described primarily with respect to a particular embodiment, various modifications can be added by those skilled in the art to the embodiment described above in the shape, material, quantity and other detailed configurations without departing from the spirit and scope of the invention. Therefore, the description that limits the shape, material and the like disclosed above is exemplified for easy understanding of the invention, and the invention is not limited thereto. Accordingly, the description of member names in addition to part or all limitations of the shape, material and the like is contained in the invention.

Here, the characteristics of the embodiment of the tape winding device 1 according to the present invention will be briefly summarized below.

A tape winding device (1) includes: a fixed plate (support plate 41 and opposing plate 42) disposed within a plane orthogonal to a longitudinal direction of a linear member (harness W1); a rotation plate (driven gear 49 and rotation panel 44) disposed adjacent to the fixed plate (support plate 41 and opposing plate 42) and configured to rotate within the plane orthogonal to the longitudinal direction of the linear member (harness W1); a fixed plate side notch (41A, 42A) formed in a U shape running from an outer peripheral edge of the fixed plate (support plate 41 and opposing plate 42) toward a central region including a rotation axis of the rotation plate (driven gear 49 and rotation panel 44); a rotation plate side notch (44A, 49A) formed into a U shape running from an outer peripheral edge of the rotation plate (driven gear 49 and rotation panel 44) toward a central region including the rotation axis of the rotation plate (driven gear 49 and rotation panel 44), the linear member (harness W1) to be inserted into or removed from the rotation plate side notch (44A, 49A) and the fixed plate side notch (41A, 42A) when a position of the rotation plate side notch (44A, 49A) is aligned with a position of the fixed plate side notch (41A, 42A); a tape support unit (50) configured to support a tape (T) to be wound around the linear member (harness W1) and rotate together with the rotation plate (driven gear 49 and rotation panel 44) with the linear member (harness W1) inserted in a bottom region of the fixed plate side notch (41A. 42A) and the rotation plate side notch (44A, 49A), the bottom region including the rotation axis of the rotation plate (driven gear 49 and rotation panel 44); and a position regulating member (101) disposed in a vicinity of a lateral side of the fixed plate (support plate 41 and opposing plate 42) and the rotation plate (driven gear 49 and rotation panel 44), the position regulating member (101) to be positioned at a retracted position when the linear member (harness W1) is inserted into or removed from the fixed plate side notch (41A, 42A) and the rotation plate side notch (44A, 49A), the position regulating member (101) to be positioned at a regulation position after insertion of the linear member (harness W1), and the position regulating member (101) configured to regulate a position of the linear member (harness W1) in the fixed plate side notch (41A, 42A) and the rotation plate side notch (44A, 49A) such that the linear member (harness W1) is located at the bottom region of the fixed plate side notch (41A. 42A) and the rotation plate side notch (44A, 49A).

The tape winding device (1) may further include: a wiring board (10) configured to hold the linear member (harness W1) in a fixed state; and a head unit (3) configured to move straight along the linear member (harness W1) held by the wiring board (10). The head unit (3) may include a slide member, the slide member being movable within a plane orthogonal to the linear member (harness W1) relative to the linear member (harness W1) held in the fixed state, the fixed plate (support plate 41 and opposing plate 42) and the rotation plate (driven gear 49 and rotation panel 44) being mounted on the slide member, and the slide member configured to slide such that the linear member (harness W1) is inserted into or removed from the fixed plate side notch (41A, 42A) and the rotation plate side notch (44A, 49A). The position regulating member (101) may be located at a position corresponding to the fixed plate (support plate 41 and opposing plate 42) and the rotation plate (driven gear 49 and rotation panel 44) when the fixed plate (support plate 41 and opposing plate 42) and the rotation plate (driven gear 49 and rotation panel 44) are in an insertion position of the linear member (harness W1) relative to the fixed plate side notch (41A, 42A) and the rotation plate side notch (44A, 49A), and the position regulating member (101) being movable from the retracted position to the regulation position at the position.

The tape winding device may further include: a linear member holding mechanism (150) provided on two sides of the fixed plate (support plate 41 and opposing plate 42) and the rotation plate (driven gear 49 and rotation panel 44) in the longitudinal direction of the linear member (harness W1), the linear member holding mechanism (150) configured to hold the linear member (harness W1) in a vicinity of the rotation axis of the rotation plate (driven gear 49 and rotation panel 44) when the linear member (harness W1) is inserted into the fixed plate side notch (41A. 42A) and the rotation plate side notch (44A, 49A), and the rotation plate (driven gear 49 and rotation panel 44) is being rotated.

What is claimed is:

1. A tape winding device comprising:
    a fixed plate disposed within a plane orthogonal to a longitudinal direction of a linear member;
    a rotation plate disposed adjacent to the fixed plate and configured to rotate within the plane orthogonal to the longitudinal direction of the linear member;
        wherein the fixed plate has a fixed plate side notch formed in a U shape running from an outer peripheral edge of the fixed plate toward a central region including a rotation axis of the rotation plate;
        wherein the rotation plate has a rotation plate side notch formed into a U shape running from an outer peripheral edge of the rotation plate toward a central region including the rotation axis of the rotation plate, the linear member to be inserted into or removed from the rotation plate side notch and the fixed plate side notch when a position of the rotation plate side notch is aligned with a position of the fixed plate side notch;
    a tape support unit configured to support a tape to be wound around the linear member and rotate together with the rotation plate with the linear member inserted in a bottom region of the fixed plate side notch and the rotation plate side notch, the bottom region including the rotation axis of the rotation plate; and
    a position regulating member disposed in a vicinity of a lateral side of the fixed plate and the rotation plate, the position regulating member to be positioned at a retracted position when the linear member is inserted into or removed from the fixed plate side notch and the rotation plate side notch, the position regulating member to be positioned at a regulation position after the linear member is inserted into the fixed plate side notch and the rotation plate side notch, and the position regulating member configured to regulate a position of the linear member in the fixed plate side notch and the rotation plate side notch such that the linear member is located at the bottom region of the fixed plate side notch and the rotation plate side notch,
    wherein the position regulating member is formed into an arm-shape, the position regulating member comprising a distal end arm portion, and
    wherein, at the regulation position,
    the distal end arm portion extends to a direction orthogonal to a direction to which the fixed plate side notch opens within the plane orthogonal to the linear member, and
    the distal end arm portion runs across an opening of the fixed plate side notch, the distal end arm portion extending over two opposing inner edges of the fixed plate side notch.

2. The tape winding device according to claim 1 further comprising:
    a wiring board configured to hold the linear member in a fixed state; and
    a head unit configured to move straight along the linear member held by the wiring board,
    wherein the head unit comprises a slide member, the slide member being movable within a plane orthogonal to the linear member relative to the linear member held in the fixed state, the fixed plate and the rotation plate being mounted on the slide member, and the slide member configured to slide such that the linear member is inserted into or removed from the fixed plate side notch and the rotation plate side notch, and
    wherein the position regulating member is located at a position corresponding to the fixed plate and the rotation plate when the fixed plate and the rotation plate are in an insertion position of the linear member relative to the fixed plate side notch and the rotation plate side notch, and the position regulating member being movable from the retracted position to the regulation position at the position.

3. The tape winding device according to the claim 1 further comprising:
    a linear member holding mechanism provided on two sides of the fixed plate and the rotation plate in the longitudinal direction of the linear member, the linear member holding mechanism configured to hold the linear member in a vicinity of the rotation axis of the rotation plate when the linear member is inserted into the fixed plate side notch and the rotation plate side notch, and the rotation plate is being rotated.

* * * * *